Daniel B. Shipp
George F. Walker
INVENTORS

BY *Emil W. Nielan*

ATTORNEY

United States Patent Office 3,540,961
Patented Nov. 17, 1970

3,540,961
PROCESS FOR FORMING BONDED, POLYMERIC SEALANT FILLED EXPANSION JOINTS
Daniel B. Shipp and George F. Walker, Trenton, N.J., assignors to Thiokol Chemical Corporation, Bristol, Pa., a corporation of Delaware
Filed May 17, 1966, Ser. No. 550,588
Int. Cl. C09j 3/30; E01c 11/10
U.S. Cl. 156—242                         11 Claims

ABSTRACT OF THE DISCLOSURE

Bonded, filled expansion joints and laminated structures comprising in combination a solid mass of a polysulfide sealant composition at least partially embedded in and adhesively self-bonded to a set hydraulic cement-aggregate concrete are made by embedding the sealant composition either in shaped, cured form, or in an in situ shaped, and curable form, into the freshly poured concrete at the desired location and allowing the concrete to set, and in the latter form, the sealant composition to cure. The cured sealant composition provides a line of weakness along which the set concrete may crack upon expansion while the sealant composition remains adhered to the concrete substrate and seals the crack against passage of fluids.

---

Figure 1:
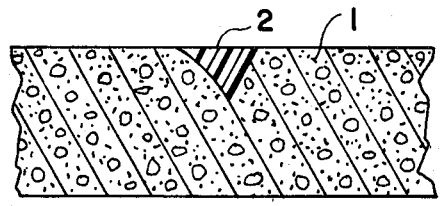

This invention relates to a novel process for adhesively bonding hydraulic cementitious material to various substrates and to a novel process for forming adhesive joints in such cementitious materials. More particularly the invention relates to a process for adhesively bonding hydraulic cementitious material to various substrates and to a process for forming adhesive joints in such cementitious material by means of a composition which comprises a polysulfide polymer and a bituminous material applied to unset hydraulic cementitious material.

A special embodiment of this invention is the use of the above described compositions as caulking compounds and as sealer compositions for joints, coatings, etc. for hydraulic cementitious vehicular and traffic installations.

The use of polysulfide polymer-bituminous material compositions for the purpose of adhesively bonding of concrete and other hydraulic cementitious materials to various substrate, and for forming joints in such hydraulic cementitious materials has received considerable attention in recent years due to the expanding need for improved materials for construction of roadways, airfields, docks, canals, buildings, and the like.

These compositions have been found to be especially desirable as joint sealants for concrete or like cementitious substrates, because of the good bond which is obtained between the concrete and sealant, and because of the elastomeric properties of the sealant which allows for expansion and contraction of the joint. However, one of the big drawbacks of such sealant joints is that considerable time and effort must be expanded from a groove in the set concrete and then to clean the groove in order to receive the sealant. This operation is frequently preformed as follows: The fresh concrete is poured. At the points where joints are desired, a plastic divider having a V-shaped cross-section is worked into the fresh, unset concrete. After the concrete has become set the plastic divider is removed and the resulting groove is cleaned of dirt, oil, or other debris which may have entered the groove in removing the divider. The sealant is then applied to the groove. Failure to thus prepare and properly clean the groove of the concrete will result in a final sealant joint which has an inferior or completely ineffective bond between the sealant and the concrete.

It is therefore an object of this invention to provide an improved and more economical process for forming bonds between materials of the type discussed. A further object is to provide an improved and more economical process for forming coatings, joints, and the like for concrete having good adhesion between the adhesive composition and the concrete or other hydraulic cementitious substrate. Yet another object is to provide novel laminated structures. Other objects will become apparent from the specification and claims.

In accordance with this invention it has now unexpectedly been found that a coating or joint sealant composition comprising a polysulfide polymer and bituminous materials can be applied to unset hydraulic cementitious materials and that upon setting of the concrete there unexpectedly results an adhesive bond of very good quality between the composition and the substrate. And while it is theoretically necessary for the above described adhesive composition to be applied to unset cementitious substrate as an uncured composition, it has unexpectedly been found that the composition of this invention can be applied to the unset cementitious substrate in the form of a cured or an uncured composition. The process of this invention when applied to sealing joints makes it possible, for example, to apply the cured or uncured sealant directly to the freshly poured, unset concrete substrate thereby eliminating time consuming and costly steps of the conventional process, i.e. forming the groove-removing the divider, and cleaning the groove. By using a preformed cured sealant strip for the joint it is also now possible to place the preformed strip in the desired position on the roadbed or other surface and then to pour the fresh, unset concrete around or over such strip.

In yet another aspect of this invention the surface of set concrete or other suitable substrate is coated or saturated with an adhesive composition of this invention. At any time thereafter a conventional aqueous mix of concrete, plaster or other hydraulic cementitious material is applied to the coated surface and allowed to set.

Figure 2:
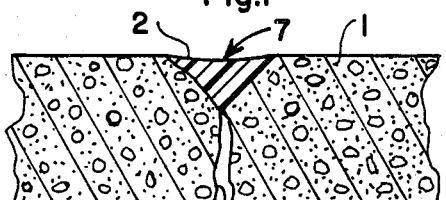
Figure 3:
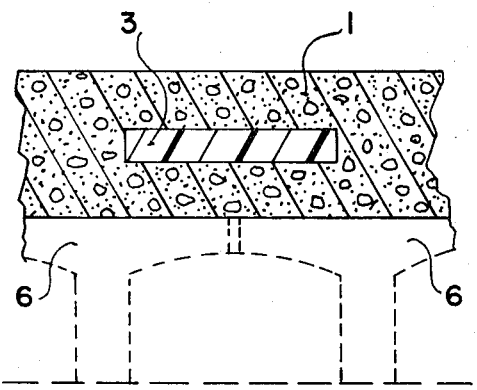
Figure 4:
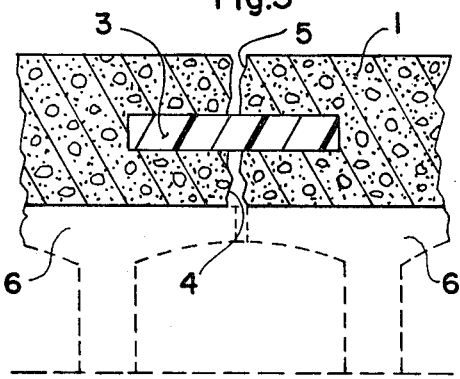

The invention is illustrated in the accompanying drawing in which:

FIG. 1 shows cured sealant composition 2 which has been partially embedded and adhesively bonded to hydraulic cement-aggregate concrete 1 according to the invention;

FIG. 2 shows the sealant composition 2 in a distended condition 7 after the substrate concrete 1 has developed a crack 4 due to stresses; the composition 2 is shown to have remained sealingly adhered to the concrete 1;

FIG. 3 shows sealant composition 3 which has been completely embedded and adhesively bonded in the concrete 1 during pouring of the concrete 1 over roof deck supports 6; and FIG. 4 shows the sealant composition 3 in a distended condition after the concrete 1 has developed cracks 4 and 5 below and above the sealant composition 3, respectively; the composition 3 is shown to have remained sealingly adhered to the concrete 1.

The compositions comprising a polysulfide polymer and bituminous material, suitable for use in this invention are, for example, those described in Horning, U.S. 2,910,922, and Simpson and Sommer, U.S. 3,238,165.

The polysulfide polymers used in the compositions of this invention are organic polymeric materials which are liquid at room temperature and which contain recurring polysulfide linkages, i.e. $\text{-(S}_n\text{)-}$, in the polymeric backbone wherein $n$ is, on the average, about 1.5 to 5. For chain extension and curing purposes these polymers should contain reactive groups such as —SH, —OH, —NH$_2$, —NCO. These polymers include for example, those polysulfide polymers disclosed in U.S. 2,466,963; isocyanate terminated polymers such as those disclosed in copending application S.N. 310,925 filed Sept. 23, 1963, in the name of E. F. Kutch; "high-rank" (—SSH) terminated polymers such as those disclosed in copending application S.N. 290,637 filed June 26, 1963, in the name of E. R. Bertozzi; blocked "high-rank" (—SSH) terminated polymers such as those disclosed in copending application S.N. 302,724 filed Aug. 16, 1963, in the name of E. R. Bertozzi; and amine (—NH$_2$) terminated polymers such as those disclosed in U.S. 2,606,173 and in S.N. 398,422 filed Sept. 22, 1964, in the name of E. R. Bertozzi. These polymers have a molecular weight of about 500 to 12,000 and are liquid, i.e., pourable at room temperature (about 25° C.). Structurally, they may be represented by the formula FR'S$_x$(RS$_x$)$_m$R'F wherein $x$ is about 1.0 to 5.0; $m$ is an integer of from 1 to about 100; R and R' are bivalent aliphatic radicals wherein the carbon atoms may be interrupted with oxygen atoms; and F may be an —SSH; —SH; —NH$_2$; OH; a hemicatal or hemiketal group of the structure

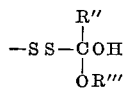

wherein R" may be H or a lower alkyl group and wherein R''' may be lower alkyl group; or an

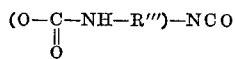

group wherein R'''' may be an alkylene or an arylene group.

The most preferred of such polymers, according to the present invention, are those having a molecular weight of about 500 to 7500, since polymers having these preferred molecular weights allow for the most efficient cure times.

The curing agents for the liquid polysulfide polymers which may be used in the compositions of the present invention include all those materials known to the art as liquid polysulfide polymer curing agents such as polyepoxy resins, lead peroxide, calcium peroxide, barium peroxide, tellurium dioxide, manganese dioxide, cumene hydroperoxide, zinc peroxide, p-quinonedioxime, zinc oxide, the various chromate salts such as are disclosed in U.S. 2,964,503, the curing agents of U.S. 2,606,173 and the copending applications previously cited, and the curing agents and accelerating agents of U.S. 3,225,017. About 2.5 to 10 parts by weight of one or more of such curing agents should be used according to the present invention, per 100 parts by weight of liquid polysulfide polymer being used in the sealant composition. These curing agents may be used singularly or in various combinations with one another.

The bituminous materials used in the compositions of this invention include the materials described in U.S. 3,238,165 and in Abraham, "Asphalts and Allied Substances," 6th edition. They include products derived from petroleum, such as, for example, asphalts, residual fuel oils and the like; high boiling extracts of petroleum, such as those obtained by extracting petroleum with solvents having preferential selectivity for aromatic; residual fuel oils; and coal derivatives, such as, for example, coal tars, refined coal tars and coal tar pitches.

The compositions of this invention may also contain a polyepoxide possessing, on the average, more than one vicinal epoxy group, i.e., more than one

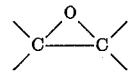

group such as those disclosed in U.S. 3,238,165.

The compositions of this invention may be used in conjunction with adhesion primers and may also contain various types of materials commonly employed in such compositions such as adhesive additives, fillers, plasticizers, pigments, ultraviolet light stabilizers, cure accelerators, perfumes, mineral aggregate, ground resinous materials, sand and the like.

The relative amounts of the various components of the polysulfide polymer-bituminous material composition of this invention will be varied depending upon the particular properties desired for the various applications within the scope of this invention. In general the polysulfide polymer may be present in a range of from about 10% to about 40% by weight of the final composition. The bituminous materials will generally be present in a weight ratio of at least 1:1 with respect to the polymer. A preferred ratio is 2 parts of bituminous materials to 1 part polysulfide polymer. In general the bituminous material may be present in an amount varying from about 5% to about 80% by weight of the final composition. The polyepoxide, if any, will generally be present in an amount varying from 15% to 90% by weight of the mixture of polyepoxide and bituminous material, and at least .8 equivalent of the polysulfide polymer being present per equivalent of polyepoxide with an equivalent of polysulfide polymer being one —SH group per epoxide group.

The invention is useful for forming improved joints in mortar, gypsum plaster, portland cement, magnesium aluminate cement, so-called magnesium oxychloride cement, concretes made from such cements, terrazzo, plaster of Paris, and like hydraulic cementitious materials. The invention is in addition useful for obtaining improved bonds when applying these hydraulic cementitious materials to set concrete or other cementitious materials, wood, brick, lath, iron, steel, aluminum, copper, zinc and other metals, plastics, glass, glazed tile, vitrified tile, ceramic tile and other heat fired surfacing materials, marble, granite and other natural stone, and the like. The joints which may be formed by the process of this invention are the conventional joints for bonding together two bodies having a space between the adjacent surfaces of such bodies. The joints may also be those formed by placing a bead of sealant in the cementitious substrate so as to cause a point or line of weakness in such substrate. This latter method is often preferred from a commercial standpoint due to the savings in the amount of sealant used. The point or line of weakness thus created will generally assure that upon contraction or expansion of the substrate, a crack of the substrate, if any, will occur along this line of weakness, thereby turning the joint into a conventional joint, which because it is adhesively bonded to the cementitious substrate, prevents water or other liquid from passing through the crack and damaging the roadbed, sidewalk, or the like. A cross-section of the joints thus formed may be of various shapes, e.g. rectangular, square, round, triangular, or combinations of these. A preferred cross-section shape for the sealant bead is triangular with one side of the triangle forming part of the exposed surface of the cementitious substrate and with a vertex of such triangle pointing inward into the body of such vehicular and traffic installation. The joint may be completely submerged within the cementitious substrate or it may be placed at any point from the base of the substrate to the top of the substrate.

The following examples are merely illustrative of the invention described herein and are not intended as a limitation upon the scope thereof.

EXAMPLE 1

A sealant composition is prepared by preparing two compositions, designated A and B, which when admixed in equal volumes result in a rapidly setting admixture C, as follows:

|  | Parts by weight | | |
|---|---|---|---|
|  | A | B | C |
| Coal tar [1] | 110 | 75 | 185 |
| Polysulfide polymer [2] |  | 100 | 100 |
| Lead peroxide | 13 |  | 13 |
| Silica thickener |  | 25 | 25 |
| Carbon black filler |  | 17 | 17 |

[1] Coal tar oil fraction having a viscosity of less than 50 poises at 77° F.
[2] The polysulfide polymer has essentially the structure

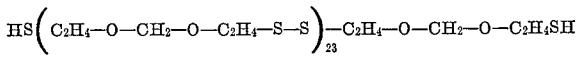

with about 4% crosslinking or branching, has a molecular weight of about 4,000, and an average viscosity at 77° F. of 400 poises.

(a) Components A and B are admixed in equal volumes and the admixture is applied as a sealant strip to a block of set concrete within a minute or two of mixing, and allowed to cure for 24 hours at room temperature. The sealant strip is applied and tested for adhesion according to the procedure of ASTM #D903. The bond fails after 8 pounds per inch of pull is applied. The bond failure is in the sealant rather than at the interface between the concrete and the sealant and therefore is termed a "cohesive failure."

(b) Immediately after admixing, the above described mixture C is poured into a ribbon-shaped tin mold having dimensions of 2" x 6" x ¼" and allowed to cure. The cure is complete after 9 minutes. Three hours after pouring into the mold the cured sealant strip thus formed is removed from the mold and is then pressed into the surface of some fresh unset concrete. The concrete is then allowed to set up for 48 hours. When tested on the Instron tensile tester at the end of this time in a manner similar to that described in ASTM #D903, the bond suffers cohesive failure after 8 pounds per inch of pull. Thus the failure of the bond is not at the interface between the sealant and the concrete block, but rather is a break in the sealant itself.

EXAMPLE 2

Components A and B of Example 1 are admixed in equal volumes and the admixture is allowed to cure at room temperature for 30 days. The ribbon-shaped cured sealant strip thus formed is embedded in a freshly poured, unset aqueous admixture of portland cement-aggregate. After 48 hours the bond between the sealant and the set concrete shows good adhesion. The bond when tested as in Example I gives "cohesive failure."

EXAMPLE 3

Components A and B of Example 1 are admixed in equal volumes and the mixture is immediately applied to the surface of a freshly poured, unset aqueous mixture of portland cement-aggregate. After 48 hours the bond between sealant and the set concrete shows good adhesion. A test according to the procedure of Example 1 results in "cohesive failure" of the bond.

EXAMPLE 4

A sealant formulation is prepared by admixing components A and B of the following composition:

|  | Parts by weight | |
|---|---|---|
|  | A | B |
| Coal tar [1] | 10 | 10 |
| Polyepoxide [2] |  | 100 |
| Polysulfide [3] | 100 |  |
| Tris(dimethyl-aminomethyl)phenol | 10 |  |

[1] Heavy coal tar oil fraction having a viscosity less than 50 poises at 77° F.
[2] The polyepoxide is prepared in the manner described for Polyether E of U.S. patent No. 2,633,458.
[3] The polysulfide polymer has essentially the structure

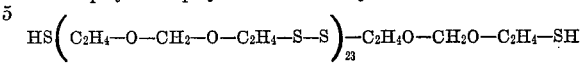

with about 3% crosslinking.

Immediately after admixing the sealant formulation is applied as a sealant strip or bead to an aqueous mixture of portland cement-aggregate and tested as in Example 3 after the concrete has set up. The sealant shows good adhesion to the set concrete.

We claim:
1. A process for forming bonded, filled expansion joints and laminated structures which comprise in combination a layer or a shaped solid mass of cured polymeric sealant composition at least partially embedded in and adhesively self-bonded to a set hydraulic cementitious material substrate and in which combination the joints and structures so formed retain an adhesive bond between the sealant composition and the substrate under conditions of cracking, expansion and contraction of the adjacent substrate, said process comprising
   placing a shaped mass of an adhesive sealant composition essentially into at least partially embedded, adhesively self-bonding contact with a substrate surface of a mass of unset hydraulic cementitious material, and
   allowing the cementitious material to set and the sealant composition to self-bond itself to said substrate surface of the set cementitious material,
   said mass of adhesive sealant composition consisting essentially of
   in situ shaped, curable, fluid, uncured adhesive sealant forming composition essentially of, by weight, from about 10% to about 40% of polysulfide polymer, from about 5% to 80% of bituminous material and curing agent for said polymer.
2. A process as in claim 1 wherein said composition is applied as a coating to said unset substrate.
3. A process as in claim 1 wherein said bituminous material is a coal tar.
4. A process as in claim 1 wherein the mass of adhesive sealant composition is completely embedded in the mass of unset hydraulic cementitious material.
5. A process as in claim 4 wherein said composition contains polyepoxide.
6. A process as in claim 4 wherein said composition is first applied as a coating to a substrate and the resulting coated substrate is then applied to an unset hydraulic cementitious substrate.
7. A process as in claim 4 wherein said bituminous material is a coal tar.
8. A process as in claim 4 wherein the mass of adhesive sealant composition is placed in the unset hydraulic cementitious material at a location intended to create a line of weakness in the set material.
9. The process as in claim 8 wherein the mass of adhesive sealant composition is shaped in the form of an expansion joint khose cross-section is rectangular, square, round, triangular or a combination thereof.
10. A process as in claim 1 wherein the mass of adhesive sealant composition is placed in the unset hydraulic cementitious material at a location intended to create a line of weakness in the set material.

11. The process as in claim 10 wherein the mass of adhesive sealant composition is shaped in the form of an expansion joint whose cross-section is rectangular, square, round, triangular or a combination thereof.

References Cited
UNITED STATES PATENTS

| | | | |
|---|---|---|---|
| Re. 17,792 | 9/1930 | Pater | 52—396 |
| 2,910,922 | 11/1959 | Horning | 260—28 |
| 3,023,681 | 3/1962 | Worson | 52—296 X |
| 3,238,165 | 3/1966 | Simpson et al. | 260—28 |
| 3,276,336 | 10/1966 | Crone | 94—18 |
| 3,316,194 | 4/1967 | Payne et al. | 260—28 |

JOHN T. GOOLKASIAN, Primary Examiner

G. W. MOXON II, Assistant Examiner

U.S. Cl. X.R.

52—396, 403, 573; 94—18, 20, 24; 156—327, 337; 260—28